(12) United States Patent
Miyabe

(10) Patent No.: US 11,827,868 B2
(45) Date of Patent: Nov. 28, 2023

(54) APPARATUS FOR PRODUCING SPARKLING FRUIT LIQUOR RAW MATERIAL

(71) Applicant: TAIYO ENGINEERING CO., LTD., Okayama (JP)

(72) Inventor: Ken Miyabe, Okayama (JP)

(73) Assignee: TAIYO ENGINEERING CO., LTD., Okayama (JP)

( * ) Notice: Subject to any disclaimer, the term of this patent is extended or adjusted under 35 U.S.C. 154(b) by 41 days.

(21) Appl. No.: 17/531,933

(22) Filed: Nov. 22, 2021

(65) Prior Publication Data

US 2022/0162530 A1 May 26, 2022

(30) Foreign Application Priority Data

Nov. 24, 2020 (JP) ................................. 2020-194711

(51) Int. Cl.
| | |
|---|---|
| *C12G 3/024* | (2019.01) |
| *C12G 1/00* | (2019.01) |
| *C12G 1/06* | (2019.01) |

(52) U.S. Cl.
CPC ............... *C12G 3/024* (2019.02); *C12G 1/00* (2013.01); *C12G 1/06* (2013.01)

(58) Field of Classification Search
CPC ............. C12G 1/00; C12G 1/06; C12G 3/024
USPC .......................................................... 99/276
See application file for complete search history.

(56) References Cited

U.S. PATENT DOCUMENTS

| | | | |
|---|---|---|---|
| 4,612,849 A | * | 9/1986 | Konischev ............... C12G 1/06 426/15 |
| 4,981,700 A | | 1/1991 | Sarishvili et al. |
| 2020/0318040 A1 | | 10/2020 | Yoldi |

FOREIGN PATENT DOCUMENTS

| | | | |
|---|---|---|---|
| CN | 109181931 | | 1/2019 |
| CN | 113403169 A | * | 9/2021 |
| DE | 3411961 | | 10/1985 |
| GB | 2532931 | | 6/2016 |
| JP | 10-313848 | | 12/1998 |
| JP | 2005-512588 | | 5/2005 |

* cited by examiner

*Primary Examiner* — Nathaniel E Wiehe
*Assistant Examiner* — Ket D Dang
(74) *Attorney, Agent, or Firm* — Clark & Brody LP

(57) ABSTRACT

The present invention provides an apparatus for producing a sparkling fruit liquor raw material, including: a sealed fermentation container for receiving a stock liquid in which a fruit juice-containing fruit raw material and yeast are mixed; and an extraction pipe having an extraction inlet disposed in the fermentation container and an extraction outlet disposed outside the fermentation container. The sparkling fruit liquor raw material is produced by undergoing a sparkling fruit liquor raw material production state St1 configured such that a stock liquid is charged in the fermentation container so that a top surface of the stock liquid is positioned higher than the extraction inlet, and a pressure of carbon dioxide gas generated as fermentation of the stock liquid proceeds is then used to continuously extract, from the fermentation container via the extraction pipe, the sparkling fruit liquor raw material produced as the stock liquid is fermented.

1 Claim, 12 Drawing Sheets

| Sample 1 | | | | | | | | | | | |
|---|---|---|---|---|---|---|---|---|---|---|---|
| | | Yeast: Frozen mulberry (100 g) Fermentation temperature: 20~30°C | | | | | | | | | |
| Production lot number (X$^{th}$ lot) | 1 | 2 | 3 | 4 | 5 | 6 | 7 | 8 | 9 | | Average |
| Production time (h) | 97 | 40 | 24 | 48 | 48 | 34 | 32 | 30 | 24 | | 41.9 |
| Volume (cc) of production per h | 5.1 | 12.5 | 20.8 | 10.4 | 10.4 | 14.7 | 15.6 | 16.7 | 20.8 | | Average 14.1 |
| Initial sugar content Brix value / Final sugar content Brix value | 11.1/10 | 11.1/7 | 11.1/8 | 11.1/8 | 11.1/8 | 11.1/8 | 11.1/8 | 11.1/8 | 11.1/10 | | |
| Amount of sugar consumed Brix value | 1.1 | 4.1 | 3.1 | 3.1 | 3.1 | 3.1 | 3.1 | 3.1 | 1.1 | | Average 2.76 |

Initial sugar content (Brix value) = 50/450 × 100 ≒ 11.1(%)

FIG. 2

| Sample 2 | Yeast: 35 grains of muscat berry A (refrigerated ones)<br>Fermentation temperature: 20~30°C | | | | | | | | | |
|---|---|---|---|---|---|---|---|---|---|---|
| Production lot number (X$^{th}$ lot) | 1 | 2 | 3 | 4 | 5 | 6 | 7 | 8 | 9 | |
| Production time (h) | 126 | 37 | 35 | 20 | 18 | 26 | 27 | 31 | 19 | Average 37.7 |
| Volume (cc) of production per h | 4.0 | 13.5 | 14.3 | 25.0 | 27.6 | 19.2 | 18.5 | 16.1 | 26.3 | Average 18.3 |
| Initial sugar content Brix value / Final sugar content Brix value | 14.2/14 | 14.2/13 | 14.2/14 | 14.2/13 | 14.2/11 | 14.2/10 | 14.2/10 | 14.2/11 | 14.2/13 | |
| Amount of sugar consumed Brix value | 0.2 | 1.2 | 0.2 | 1.2 | 3.2 | 4.2 | 4.2 | 3.2 | 1.2 | Average 2.08 |

Initial sugar content (Brix value) = 50/350 × 100 ≒ 14.2(%)

FIG. 3

Sample 3  Yeast: 49 grains of muscat berry A (at day 50 after harvest)
Fermentation temperature: 20~30°C

| Production lot number (X$^{th}$ lot) | 1 | 2 | 3 | 4 | 5 | |
|---|---|---|---|---|---|---|
| Initial sugar content (Brix value calculated) Initial sugar content (Brix value) =38/200×100 ≒19.0(%) | 19.0 | 19.0 | 19.0 | 19.0 | 19.0 | |
| | Immediately after extraction | Immediately after extraction | After container filling | After container filling | After container filling | Average |
| Final sugar content Brix value measured (after the storage container was filled with 500 cc) | 20.0 | 17.5 | 12.0 | 13.0 | 12.0 | 14.9 |

FIG. 4

Test results of testing mountain grapes (pre-fermentation mountain grapes A)
(by a potato dextrose agar plate culture method)

| Test item | Alcohol concentration | Test Results |
|---|---|---|
| Alcohol resistant yeast (quantification) | 0% | $2.4 \times 10^7$/g |
| | 2.5% | $8.9 \times 10^6$/g |
| | 5.0% | $6.5 \times 10^6$/g |
| | 10% | $2.4 \times 10^3$/g |

FIG. 5

Test results of testing mountain grapes (fermenting mountain grapes B)
(by a potato dextrose agar plate culture method)

| Test item | Alcohol concentration | Test Results |
|---|---|---|
| Alcohol resistant yeast (quantification) | 0% | $1.4 \times 10^7/mL$ |
| | 2.5% | $1.3 \times 10^7/mL$ |
| | 5.0% | $1.5 \times 10^7/mL$ |
| | 10% | $1.7 \times 10^7/mL$ |

FIG. 6

APPARATUS FOR PRODUCING SPARKLING FRUIT LIQUOR RAW MATERIAL

BACKGROUND

Technical Field

The present invention relates to an apparatus and a method for producing a sparkling fruit liquor raw material in order to continuously produce the sparkling fruit liquor raw material.

Related Art

Conventionally, in the case of producing a sparkling fruit liquor, there have been adopted a method including transferring a base wine into a bottle, adding sugar and yeast, tightly sealing the bottle to trap, in a liquid, carbon dioxide gas generated through secondary fermentation and thus providing a sparkling characteristic; and a method including filling a bottle with sugar and yeast remaining during fermentation, and securing carbon dioxide gas by continuing fermentation (see "Wine", [online], Wikipedia, [searched on Nov. 9, 2020], Internet <URL:

https://ja.wikipedia.org/wiki/%E3%83%AF
%E3%82%A4%E3%83%B3#%
E7%89%B9%E6%AE%8A%E3%81%AA%E9%86%B8%
E9%80%A0%E6%8A%80%E8%A1%93>; and "Sparkling wine", [online], Wikipedia, [searched on Nov. 9, 2020], Internet <URL:

https://ja.wikipedia.org/wiki/
%E3%82%B9%E3%83%91%E3%83%BC%E
3%82%AF%E3%83%AA%E3%83%B3%E3%82%B0%E3
%83%AF%E3%82%A4%E3%83% B3>).

In addition, examples of a method for producing a fruit liquor that undergoes a state pressurized with carbon dioxide gas include a method for producing a Beaujolais Nouveau. In this production method, whole bunches of grapes are first packed in a fermentation tank, and the lower grapes are then crushed by weight. After that, the crushed grapes are fermented with enzymes instead of yeast, and the fermentation container is filled with carbon dioxide gas. Finally, brewing in the fermentation container for several days is followed by squeezing, adding supplementary sugar and yeast, and re-fermenting for production. This production method is intended to produce a fruit liquor in a short period of time (see "Beaujolais's wine", [online], Wikipedia, [searched on Nov. 9, 2020], Internet <URL:

https://ja.wikipedia.org/wiki/%E3%83%9C %E3%82%
B8%E3%83%A7%E
3%83%AC%E3%83%BC%E3%83%AF
%E3%82%A4%E3%83%B3>).

Note that the purpose of using carbon dioxide gas contained in a sparkling alcoholic beverage is found to obtain a sparkling characteristic in the method of producing a "champagne", or to provide a possibility of controlling an aroma component in beer (see "Champagne", [online], Wikipedia, [searched on Nov. 9, 2020], <URL:

https://ja.wikipedia.org/wiki/%E3%82%
B7%E3%83%A3%E3%83% B3%E
3%83%91%E3%83%53>).

CITATION LIST

Patent Document

Patent Document 1: JP 2005-512588 A

SUMMARY

However, in the conventional method for producing a sparkling fruit liquor, it is necessary to prepare each tank for fermenting fruit juice at the time of producing a fruit liquor as a base for the sparkling fruit liquor. In addition, it is troublesome to transfer the fruit liquor for the step of adding carbon dioxide gas to the fruit liquor. Further, the transfer timing, for example, is restricted. In particular, the conventional production method may be performed in order to produce a small amount of sparkling fruit liquor that is to be served to customers in a rural inn or a rural guest house under the special provision of the Liquor Tax Act. This is very bothersome. There is also a problem that it is difficult to flexibly respond to fluctuations in demand.

In addition, the purpose of using carbon dioxide gas in sparkling alcoholic beverages such as sparkling fruit liquors is to improve the pressure of a fermenter in individual steps during production, to control the flavor component in an environment in which a fruit liquor raw material is anaerobically adjusted in the above steps, or to obtain a sparkling characteristic in the sparkling alcoholic beverages. At the time of production, in particular, after the objective is achieved, the carbon dioxide gas is often released to the atmosphere. Unfortunately, the carbon dioxide gas is not effectively utilized.

In order to solve the above problems, a first item of the invention provides an apparatus for producing a sparkling fruit liquor raw material, including:

a fermentation container that is sealed and for receiving a stock liquid in which a fruit juice-containing fruit raw material and yeast are mixed; and an extraction pipe having an extraction inlet disposed floating at a lower portion of the fermentation container and over a bottom surface in the fermentation container and an extraction outlet disposed outside the fermentation container, a partway of the extraction pipe being arranged so as to pass through a position higher than an upper limit position of the stock liquid in the fermentation container, wherein the sparkling fruit liquor raw material is produced by undergoing a sparkling fruit liquor raw material production state configured such that the stock liquid is charged in the fermentation container so that a top surface of the stock liquid is positioned higher than the extraction inlet, and a pressure of carbon dioxide gas generated as fermentation of the stock liquid proceeds is then used to continuously extract, from the fermentation container via the extraction pipe, the sparkling fruit liquor raw material produced as the stock liquid is fermented.

Examples of the fruit raw material include, but are not particularly limited to, fruit juice as well as fruit, crushed fruit, or fruit liquor. For the stock liquid, natural yeast that fruit has on its skin may be used as the yeast. Meanwhile, fermentation by yeast may be or is not necessarily started in the stock liquid. Further, a sugar liquid used to be able to adjust a sugar content may be added to the stock liquid. Alternatively, the sparkling fruit liquor raw material may be continuously produced by supplying the sugar liquid to the stock liquid in the fermentation container, the volume of which stock liquid decreases as the sparkling fruit liquor raw material is produced.

According to this configuration, the pressure in the fermentation container increases in response to the amount of carbon dioxide gas generated as fermentation of the stock liquid proceeds. This makes it possible for a sparkling fruit liquor raw material, which is produced as the stock liquid is fermented, to be continuously extruded and extracted from the fermentation container via the extraction pipe. This is advantageous because there is no need to supply energy from the outside or consume labor.

A second item of the invention provides the apparatus for producing a sparkling fruit liquor raw material according to the first item, further including:

a ventilation port part disposed at an upper end portion of the fermentation container;

a ventilation control float disposed in the fermentation container and provided such that when a liquid level in the fermentation container reaches the upper limit position, the ventilation port part is closed and when the liquid level in the fermentation container is lower than the upper limit position, the ventilation port part is opened;

a supply pipe having a supply inlet disposed outside the fermentation container and a supply outlet disposed at an upper end portion of the fermentation container, the supply pipe configured to supply a sugar liquid into the fermentation container; and a supply control float disposed in the fermentation container and provided such that when the liquid level in the fermentation container reaches the upper limit position, the supply outlet is closed and when the liquid level in the fermentation container is lower than the upper limit position, the supply outlet is opened, wherein the sparkling fruit liquor raw material is produced by repeating two states:

a sparkling fruit liquor raw material production state configured such that the stock liquid is charged in the fermentation container until the stock liquid reaches the upper limit position, and a pressure of carbon dioxide gas generated as fermentation of the stock liquid proceeds then causes the ventilation control float and the supply control float to tightly close the ventilation port part and the supply outlet, respectively, while the state is maintained so as to continuously extract, from the fermentation container via the extraction pipe, the sparkling fruit liquor raw material produced as the stock liquid fermented; and a sugar liquid supply state configured such that after the stock liquid in the fermentation container is extracted via the extraction pipe to the extraction inlet and the carbon dioxide gas then starts discharging through the extraction pipe, a decrease in the pressure of the fermentation container causes the ventilation control float and the supply control float to open the ventilation port part and the supply outlet, respectively, so that the carbon dioxide gas in the fermentation container is discharged through the ventilation port part and the sugar liquid is supplied via the supply pipe into the fermentation container.

The sugar liquid may contain, but is not particularly limited to, a component(s) (e.g., fruit juice, an enzyme) other than sugar. In addition, the sugar content of the sugar liquid is not particularly limited, and may be any of glucose, sugar, or fructose approved by the Liquor Tax Act.

According to this configuration, the sparkling fruit liquor raw material can be continuously produced by alternately repeating two states: the sparkling fruit liquor raw material production state configured such that a pressure of carbon dioxide gas generated as fermentation of the stock liquid proceeds is used to continuously extract, from the fermentation container via the extraction pipe, the sparkling fruit liquor raw material produced as the stock liquid is fermented; and the sugar liquid supply state configured such that the sugar liquid is supplied into the fermentation container in which the volume of the stock liquid has been decreased under the sparkling fruit liquor raw material production state.

A third item of the invention provides a method for producing a sparkling fruit liquor raw material by using an apparatus including:

a fermentation container that is sealed and for receiving a stock liquid in which a fruit juice-containing fruit raw material and yeast are mixed; and an extraction pipe having an extraction inlet disposed floating at a lower portion of the fermentation container and over a bottom surface in the fermentation container and an extraction outlet disposed outside the fermentation container, a partway of the extraction pipe being arranged so as to pass through a position higher than an upper limit position of the stock liquid in the fermentation container, the method including a sparkling fruit liquor raw material production step of continuously extracting, from the fermentation container via the extraction pipe, the sparkling fruit liquor raw material produced as the stock liquid is fermented by using a pressure of carbon dioxide gas generated as fermentation of the stock liquid proceeds after the stock liquid is charged in the fermentation container so that a top surface of the stock liquid is positioned higher than the extraction inlet.

This method can exert substantially the same effects as those of the apparatus for producing a sparkling fruit liquor raw material according to the first item of the invention.

A fourth item of the invention depends from the third item of the invention and provides the method for producing a sparkling fruit liquor raw material by using the apparatus further including:

a ventilation port part disposed at an upper end portion of the fermentation container;

a ventilation control float disposed in the fermentation container and provided such that when a liquid level in the fermentation container reaches the upper limit position, the ventilation port part is closed and when the liquid level in the fermentation container is lower than the upper limit position, the ventilation port part is opened;

a supply pipe having a supply inlet disposed outside the fermentation container and a supply outlet disposed at an upper end portion of the fermentation container, the supply pipe configured to supply a sugar liquid into the fermentation container; and a supply control float disposed in the fermentation container and provided such that when the liquid level in the fermentation container reaches the upper limit position, the supply outlet is closed and when the liquid level in the fermentation container is lower than the upper limit position, the supply outlet is opened, the method including:

a sparkling fruit liquor raw material production step of continuously extracting, from the fermentation container via the extraction pipe, the sparkling fruit liquor raw material produced as the stock liquid is fermented by using a pressure of carbon dioxide gas generated as fermentation of the stock liquid proceeds after the stock liquid is charged in the fermentation container until the stock liquid reaches the upper limit position so as to cause the ventilation control float and the supply control float to tightly close the ventilation port part and the supply outlet, respectively, while the state is maintained; and a sugar liquid supply step of supplying the sugar liquid via the supply pipe into the fermentation container while after the stock liquid in the fermentation container is extracted via the extraction pipe to the extraction inlet and the carbon dioxide gas then starts discharging through the extraction pipe, a decrease in the pressure of the fermentation container causes the ventilation control float and the supply control float to open the ventilation port part and the supply outlet, respectively, so that the carbon dioxide gas in the fermentation container is discharged, wherein at least the two steps are repeated to produce the sparkling fruit liquor raw material.

This method can exert substantially the same effects as those of the apparatus for producing a sparkling fruit liquor raw material according to the second item of the invention.

The apparatus and the method for producing a sparkling fruit liquor raw material according to the invention can exert excellent effects of continuously producing a sparkling fruit liquor raw material without supplying energy from the outside or consuming labor by utilizing the pressure of carbon dioxide gas generated as fermentation of a stock liquid proceeds.

BRIEF DESCRIPTION OF DRAWINGS

FIG. 2 is a table showing an Example in which a sparkling fruit liquor raw material was produced by the production apparatus using Sample 1;

FIG. 3 is a table showing an Example in which a sparkling fruit liquor raw material was produced by the production apparatus using Sample 2;

FIG. 4 is a table showing an Example in which a sparkling fruit liquor raw material was produced by the production apparatus using Sample 3;

FIG. 5 is a table showing the results of testing, by a potato dextrose agar plate culture method, an increase or decrease in the number of yeasts in pre-fermentation mountain grapes A at an alcohol concentration ranging from 0 to 10%;

FIG. 6 is a table showing the results of testing, by a potato dextrose agar plate culture method, an increase or decrease in the number of yeasts in fermenting mountain grapes B at an alcohol concentration ranging from 0 to 10%;

DETAILED DESCRIPTION

Figure 1:
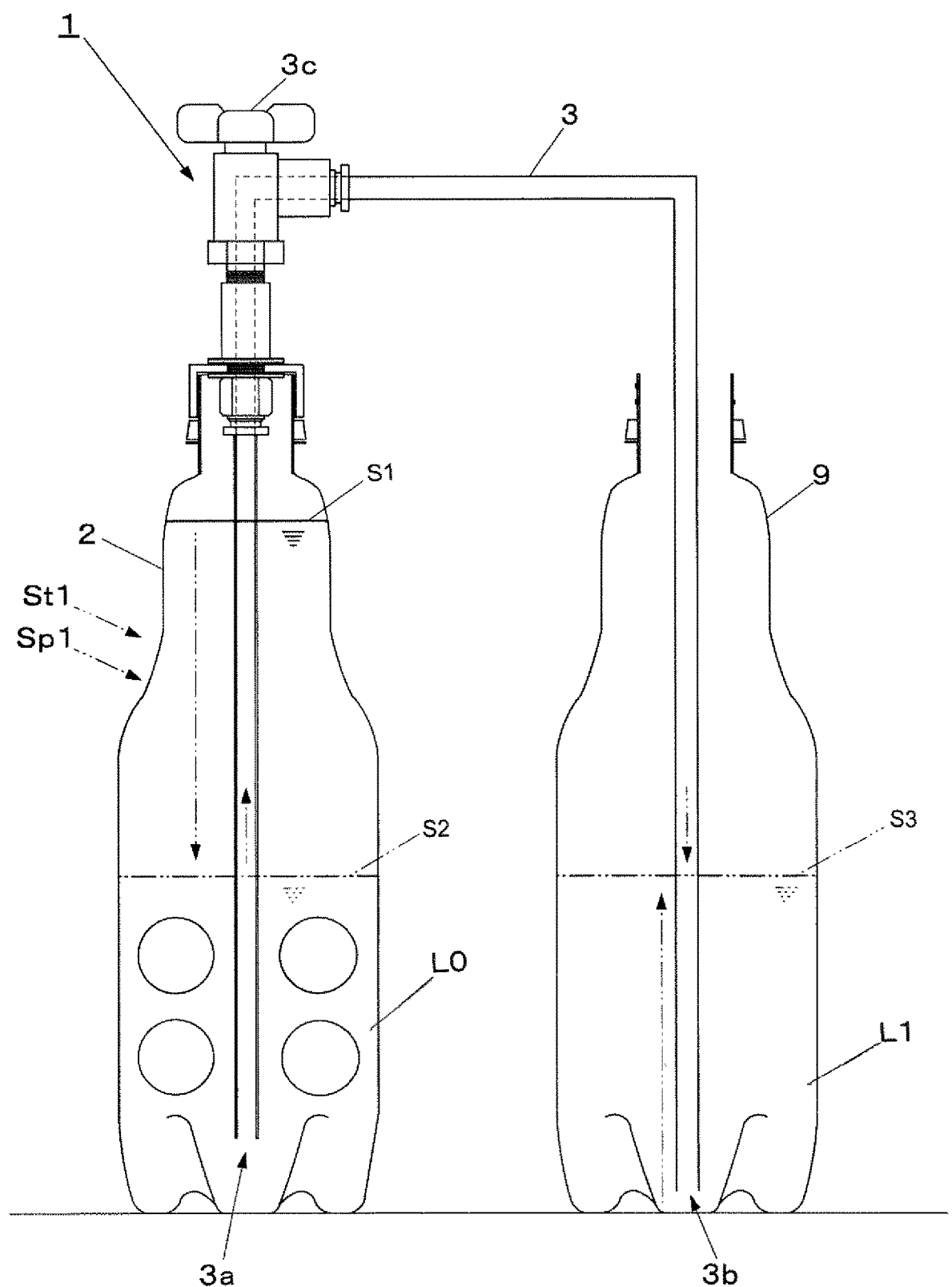
FIG. 1 is a longitudinal sectional view schematically illustrating an overall configuration of an apparatus for producing a sparkling fruit liquor raw material according to a first embodiment embodying the invention.

Hereinafter, an apparatus for producing a sparkling fruit liquor raw material according to a first embodiment embodying the invention will be described with reference to FIGS. 1 to 6 together with a production method performed using the apparatus. As shown in FIG. 1, a production apparatus 1 of this embodiment includes a fermentation container 2 and an extraction pipe 3.

The fermentation container 2 is a sealed container for receiving a stock liquid L0 in which a fruit juice-containing fruit raw material and yeast are mixed. In this embodiment, a PET bottle with a lid (volume: 500 cc) is used.

Examples of the fruit raw material include fruit juice as well as fruit, crushed fruit, or fruit liquor. Further, a sugar liquid used to be able to adjust a sugar content may be added to the stock liquid L0. For the stock liquid L0, a fruit having, on its skin, natural yeast as the yeast may be used. At this time, if the fruit is used for the hue of the produced sparkling fruit liquor raw material L1 and components to be extracted, it is unnecessary to grind and squeeze the fruit, and the trouble thereof can thus be avoided.

The extraction pipe 3 has an extraction inlet 3a disposed floating at a lower portion of a fermentation container 2 and over a bottom surface in the fermentation container 2 and an extraction outlet 3b disposed outside the fermentation container 2. Its partway is arranged so as to pass through a position (position of a through-hole provided at a lid of a PET bottle in this embodiment) higher than the upper limit position of the stock liquid L0 in the fermentation container 2. The extraction outlet 3b is positioned substantially in contact with the bottom surface of a container 9 so that the liquid surface of the extruded raw material is covered with carbon dioxide gas. Regarding the extraction pipe 3 of this embodiment, both the pipe on the extraction inlet 3a side and the pipe on the extraction outlet 3b side have an inner diameter of 5 mm. In this embodiment, a valve 3c is provided in the middle of the extraction pipe 3. The valve 3c is used in an open state during fermentation.

In this embodiment, the sparkling fruit liquor raw material L1 taken out from the extraction outlet 3b of the extraction pipe 3 is to be released into a PET bottle (volume: 500 cc) as a storage container 9 for secondary fermentation.

The apparatus 1 for producing a sparkling fruit liquor raw material L1 according to this embodiment has the above configuration and is provided such that the sparkling fruit liquor raw material L1 is produced by undergoing a sparkling fruit liquor raw material production state St1 configured such that the stock liquid L0 is charged in the fermentation container 2 so that a top surface location S1 of the stock liquid is positioned higher than the extraction inlet 3a (the position where the container is filled with 500 cc in this embodiment), and a pressure of carbon dioxide gas generated as fermentation of the stock liquid L0 proceeds is then used to continuously extract, from the fermentation container 2 via the extraction pipe 3, the sparkling fruit liquor raw material L1 produced as the stock liquid L0 is fermented, the top surface location S1 lowered to a location S2 as a result of the extraction from the fermentation container whereby the sparkling fruit liquor raw material L1 has a top surface location S3 in the storage container 9. In addition, the production method of this embodiment includes a sparkling fruit liquor raw material production step Sp1 performed under the sparkling fruit liquor raw material production state St1 while using the production apparatus 1.

Next, Examples using the production apparatus 1 and the production method according to this embodiment will be described. FIG. 2 shows the results of production at a fermentation temperature of 20 to 30° C. by using a stock liquid L0, as Sample 1, obtained by mixing 400 cc of water, 50 g of sucrose, and 100 g of frozen mulberry thawed. In addition, FIG. 3 shows the results of production at a fermentation temperature of 20 to 30° C. by using a stock liquid L0, as Sample 2, obtained by mixing 300 cc of water, 50 g of sucrose, and 35 grains of refrigerated muscat berry A. In Samples 1 and 2, when the pressure in the fermentation container 2 reached 300 to 500 Pa (numerical value measured with a pressure gauge), the sparkling fruit liquor raw material L1 started to be extracted. In this Example, the pressure required for extrusion by fermentation is from 300 to 500 Pa. Hence, there is no particular safety problem. This pressure increases in proportion to the inner diameter of the extraction pipe 3. The average amount of sugar consumed until the sparkling fruit liquor raw material L1 has been extracted (the amount is assumed to be equal to the Brix value; the same applies to the following) is 2.76 in FIG. 2 and is 2.08 in FIG. 3. Thus, they are averaged to give 2.42.

The amount of sugar (Brix value) at which the internal pressure of the fermentation container 2 is less than 1 MPa, specifically 0.9 MPa, can be determined by the following calculation while the temperature is assumed to be 20° C.

First, the mass of carbon dioxide at which the fermentation container 2 (PET bottle) is at 0.9 MPa can be determined as follows.

$$P = M \cdot R \cdot T / V$$

where
P: pressure (p);
M: carbon dioxide mass (kg);
R: gas constant 188.9 (J/K·K);
T: absolute temperature (273 20=293 K);
V: 0.005 m³ (PET bottle: 500 cc); and $$M = \frac{P \cdot V}{R \cdot T}$$
$$= \frac{900000 \cdot 0.005}{188.9 \cdot 293}$$
$$= \frac{450}{55347.7}$$
$$= 0.00813 \text{ kg}$$
$$= 8.13 \text{ g}$$

Next, the substance amount (mol) can be determined from the mass of carbon dioxide as follows.

$$\text{Substance amount (mol)} = \frac{\text{Mass (g)}}{\text{Molar Mass (g/mol)}}$$
$$= \frac{8.13}{44}$$
$$= 0.1848$$

The substance amount (mol) of glucose (sugar) is ½ of carbon dioxide generated from glucose by alcohol fermentation, and thus 0.1848×½=0.0924.

Thus, the mass of glucose can be determined by the following equation.

$$\text{Mass (g)} = \text{Mass (mol)} \times \text{Molar Mass (g/mol)}$$
$$= 0.0924 \times 180 \text{ (g/mol)}$$
$$= 16.6 \text{ g}$$

To this, the amount 2.42 of sugar consumed until the sparkling fruit liquor raw material L1 has been extracted (the amount of sugar obtained from Sample 1 or Sample 2) is added to give 19.02 as the amount of sugar (Brix value). Hence, the Brix value at which the internal pressure of the container for secondary fermentation is less than 1.0 MPa is 19.02% or less.

This amount of sugar was examined in the following Sample 3. Specifically, a sparkling fruit liquor raw material L1 was produced at a fermentation temperature of 20 to 30° C. by using a stock liquid 10 (200 cc), as Sample 3, obtained by mixing 162 cc of water, 38 g of sucrose, and 49 grains of muscat berry A. Here, 38 g of sucrose was used because an approximate value used for the sugar amount 19.05 for 100 cc of the stock liquid L0 was 19. As a result, as shown in FIG. 4, regarding the Brix value actually obtained, the first Brix value was 20 and the second Brix value was 17.5. Thus, the average thereof was 18.75, and the error was (18.75-19.02)×100/19=1.42%. The error after the container for secondary fermentation was filled with 500 cc was (12.33-19.02)×100/19=35.7%.

As described above, the approximate value for the value 19.02 obtained by totaling the numerical value obtained in the above calculation and the amount 2.42 of sugar consumed until the sparkling fruit liquor raw material L1 has been extracted (the amount of sugar obtained from Sample 1 or Sample 2) was implemented in Sample 3. Here, the error for values immediately after extraction was −1.42%, the error for values after container filling was −35.7%, and the average of errors for values immediately after extraction and after container filling was (14.9−19.02)×100/19=−21.68%.

Next, the alcohol content of the sparkling fruit liquor raw material L1 produced using the production apparatus 1 of this embodiment will be evaluated. Here, the alcohol content is determined by simple calculation, and specifically, alcohol content=(initial sugar content−final sugar content)/2. It is formally necessary to perform measurement such as a "hydrometer method" according to the National Tax Service predetermined analysis method (Ordinance No. 1, 1961). The sugar content was adjusted to the Brix value (%) by using a refractometer.

In order to check whether continuous fermentation by yeast is possible in the fermentation container 2, an increase or decrease in the number of yeasts in the pre-fermentation mountain grapes A or the fermenting mountain grapes B at an alcohol concentration ranging from 0 to 10% was tested by a potato dextrose agar plate culture method. As a result, as shown in FIG. 5, in the pre-fermentation mountain grapes A, the number of yeasts was significantly reduced at an alcohol concentration of 10%. By contrast, as shown in FIG. 6, the number of yeasts in the fermenting mountain grapes B was not significantly changed. The Brix value calculated for adjustment of sugar content in the invention was 19.02. The implemented average Brix value was 14.9. The alcohol content is ½ thereof, that is, 7.45%, and is 10% or less. Thus, continuous fermentation can be performed without reducing the number of yeast cells.

The production apparatus 1 of this embodiment was used to produce, in a sealed container from a stock liquid L0 containing 150 g of pineapple skin, a sparkling fruit liquor raw material L1 (sugar content before aging on lees: 8). This material was subject to aging on lees for 3 years and then sensory evaluation by 4 panelists. Evaluation results showed that the material had high-quality results in all of the flavor, the taste, the balance, the body, the mouth feel, the roundness, and the depth.

The apparatus 1 for producing a sparkling fruit liquor raw material L1 according to this embodiment has the above configuration and is configured such that the pressure in the fermentation container 2 increases in response to the amount of carbon dioxide gas generated as fermentation of the stock liquid L0 proceeds; and the sparkling fruit liquor raw material L1, which is produced as the stock liquid L0 is fermented, is continuously extruded and extracted from the fermentation container 2 via the extraction pipe 3. This is advantageous because there is no need to supply energy from the outside or consume labor.

In addition, conventional production apparatuses need performing troublesome preparation for each fermentation container. However, according to the production apparatus 1 of this embodiment, the sparkling fruit liquor raw material L1 can be continuously obtained without replacing the fruit raw material. Further, conventionally, when a fruit liquor in the middle of fermentation is taken out for secondary fermentation, temperature control such as lowering the temperature of the base fruit liquor to suppress the action of yeast was required. However, this operation is unnecessary in this embodiment, and the management of the brewing process can be significantly reduced as compared with the prior art. Thus, for example, a sparkling fruit liquor produced using fruit produced by oneself at a local farming family lodging, which is subject to a special provision (Section 28) of the Liquor Tax Act, may be provided. In this case, if the apparatus 1 for producing a sparkling fruit liquor raw material L1 according to this embodiment is used, the sparkling fruit liquor raw material L1 can be produced easily without any complicated process.

In addition, the apparatus 1 for producing a sparkling fruit liquor raw material L1 according to this embodiment is miniaturized. Thus, a small volume of sparkling fruit liquor raw material L1 can be produced, if appropriate. This is advantageous because the volume of production can be easily adjusted. Further, a space occupied by the production apparatus 1 is also small. Accordingly, the degree of freedom of the installation place is increased, and the environment (e.g., the temperature, humidity) of the production apparatus 1 at the installation place is easily controlled.

In addition, in the apparatus 1 for producing a sparkling fruit liquor raw material L1 according to this embodiment, the carbon dioxide gas generated in the sealed fermentation container 2 is used as a pressurization source for extracting the sparkling fruit liquor raw material L1. This makes it possible to produce the sparkling fruit liquor raw material L1 without contact with oxygen. Further, the surface of the extracted sparkling fruit liquor raw material L1 is covered with carbon dioxide gas generated therefrom. Accordingly, the contact with oxygen can be avoided even in the storage container 9 for secondary fermentation. Moreover, the extraction outlet 3b is disposed so as to be substantially in contact with the bottom of the storage container 9 for secondary fermentation. Accordingly, the contact between oxygen and the sparkling fruit liquor raw material L1 can be avoided immediately after the sparkling fruit liquor raw material L1 is released from the extraction outlet 3b.

In addition, the apparatus 1 for producing a sparkling fruit liquor raw material L1 according to this embodiment is configured such that the sparkling fruit liquor raw material L1 produced in the fermentation container 2 is continuously extracted. Accordingly, the alcohol concentration of liquid in the fermentation container 2 does not become too high. This can prevent yeast from being killed due to the increased alcohol concentration. Thus, continuous fermentation is possible.

Further, conventionally, in the case of producing a sparling fruit liquor, the harvest time of raw material fruit and the region such as the harvest place or the brewing place are limited. However, the sugar content of fruit juice needed for fermentation may be adjusted to give a sugar liquid, and fruit having natural yeast on the skin may be used to produce a stock liquid L0. In this case, frozen fruit can be thawed and used. As a result, the time and place of production can be freely selected.

Furthermore, substantially the same effects as those of the production apparatus 1 can be exerted by the production method carried out using the apparatus 1 for producing a sparkling fruit liquor raw material L1 according to this embodiment.

Next, an apparatus 1 for producing a sparkling fruit liquor raw material L1 according to a second embodiment embodying the invention will be described with reference to FIGS. 7 to 10 together with a production method performed using the apparatus. The production apparatus 1 and the production method are mainly different from those of the first embodiment in the points below. Here, the same reference numerals are given to parts common to the first embodiment, and redundant description is thus omitted.

Figure 7:
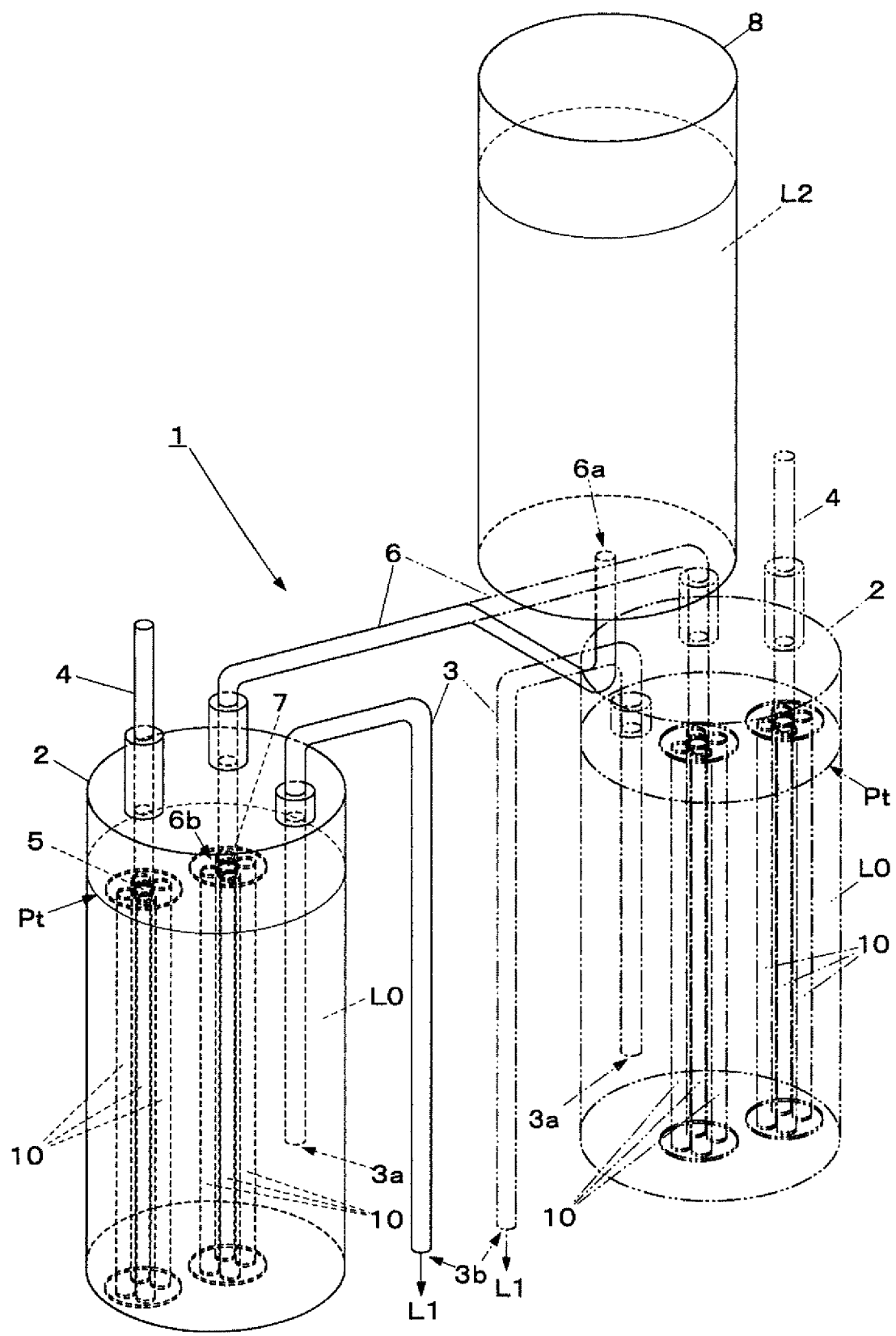
FIG. 7 is a perspective view schematically illustrating an overall configuration of an apparatus for producing a sparkling fruit liquor raw material according to a second embodiment embodying the invention.

As shown in FIG. 7, the production apparatus 1 of this embodiment includes fermentation containers 2, extraction pipes 3, ventilation port parts 4, ventilation control floats 5, a supply pipe 6, supply control floats 7, and a supply container 8. As indicated by two-dot chain lines in the drawing, a plurality of (two in the drawing) fermentation containers 2 can be connected to the supply container 8.

Each fermentation container 2 is a sealed container for receiving a stock liquid L0 in which a fruit juice-containing fruit raw material and yeast are mixed.

Each extraction pipe 3 has an extraction inlet 3a and an extraction outlet 3b. Its partway is arranged so as to pass through a position higher than the upper limit position Pt of the stock liquid L0 in the fermentation container 2. In this embodiment, the inner diameter of the extraction pipe 3 is 5 mm, and the extraction outlet 3b is open to the atmosphere. Further, in this embodiment, the sparkling fruit liquor raw material L1 taken out through the extraction outlet 3b is stored in a storage container 9 for secondary fermentation.

One of the ventilation port parts 4 is disposed at an upper end portion of the fermentation container 2, and the inside and the outside of the fermentation container 2 communicate with each other through the inside of the ventilation port part 4.

One of the ventilation control floats 5 is disposed in the fermentation container 2, and is provided such that when the liquid level in the fermentation container 2 reaches the upper limit position Pt, the ventilation port part 4 is closed, and when the liquid level in the fermentation container 2 is lower than the upper limit position Pt while the pressure of the carbon dioxide gas is not applied, the ventilation port part 4 is opened. The ventilation control float 5 in this embodiment is configured as a float ball floating on the stock liquid L0. When the liquid level in the fermentation container 2 is lower than the upper limit position Pt, the ventilation port part 4 is opened because the ventilation control float falls by its own weight. The ventilation control float 5 in this embodiment is configured to be able to reciprocate along a vertically extending float guide 10 provided below the ventilation port part 4.

The supply pipe 6 is a pipe for supplying a sugar liquid L2 into the fermentation containers 2, including a supply inlet 6a disposed outside the fermentation containers 2 and supply outlets 6b each disposed at an upper end portion of the fermentation container 2. The supply inlet 6a is connected to the supply container 8.

One of the supply control floats 7 is disposed in the fermentation container 2, and is provided such that when the liquid level in the fermentation container 2 reaches the upper limit position Pt, the supply outlet 6b is closed, and when the liquid level in the fermentation container 2 is lower than the upper limit position Pt while the pressure of the carbon dioxide gas is not applied, the supply outlet 6b is opened. Each supply control float 7 in this embodiment is configured as a float ball floating on the stock liquid L0. When the liquid level in the fermentation container 2 is lower than the upper limit position Pt, the supply outlet 6b is opened because the supply control float falls by its own weight. The supply control float 7 in this embodiment is configured to be able to reciprocate along a vertically extending float guide 10 provided below the supply outlet 6b.

The supply container 8 is a container for containing the sugar liquid L2. The supply container 8 in this embodiment is disposed above the fermentation containers 2. A supply inlet 6a of the supply pipe 6 communicates with the lower end of the supply container 8, and the sugar liquid can thus be supplied to the fermentation containers 2 via the supply pipe 6 by using a difference in the liquid level between the supply container 8 and the fermentation containers 2.

The apparatus 1 for producing a sparkling fruit liquor raw material L1 according to this embodiment has the above configuration and is configured to produce the sparkling fruit liquor raw material L1 by repeating two states: the sparkling fruit liquor raw material production state St1 and the sugar liquid supply state St2 as described below.

The sparkling fruit liquor raw material production state St1 is configured such that the stock liquid L0 is charged in the fermentation container 2 until the stock liquid L0 reaches the upper limit position Pt, and a pressure of carbon dioxide gas generated as fermentation of the stock liquid L0 proceeds then causes the ventilation control float 5 and the supply control float 7 to tightly close the ventilation port part 4 and the supply outlet 6b, respectively, while the state is maintained so as to continuously extract, from the fermentation container 2 via the extraction pipe 3, the sparkling fruit liquor raw material L1 produced as the stock liquid L0 is fermented.

The sugar liquid supply state St2 is configured such that after the stock liquid L0 in the fermentation container 2 is extracted via the extraction pipe 3 to the extraction inlet 3a and the carbon dioxide gas then starts discharging through the extraction pipe 3, a decrease in the pressure of the fermentation container 2 causes the ventilation control float 5 and the supply control float 7 to open the ventilation port part 4 and the supply outlet 6b, respectively, so that the carbon dioxide gas in the fermentation container 2 is discharged through the ventilation port part 4 and the sugar liquid L2 is supplied via the supply pipe 6 into the fermentation container 2.

In addition, the method for producing a sparkling fruit liquor raw material L1 according to this embodiment uses the production apparatus 1 and includes a sparkling fruit liquor raw material production step Sp1 performed in the sparkling fruit liquor raw material production state St1 and a sugar liquid supply step Sp2 performed in the sugar liquid supply state St2. At least the two steps are repeated to produce the sparkling fruit liquor raw material L1 by this method.

Figure 10A:
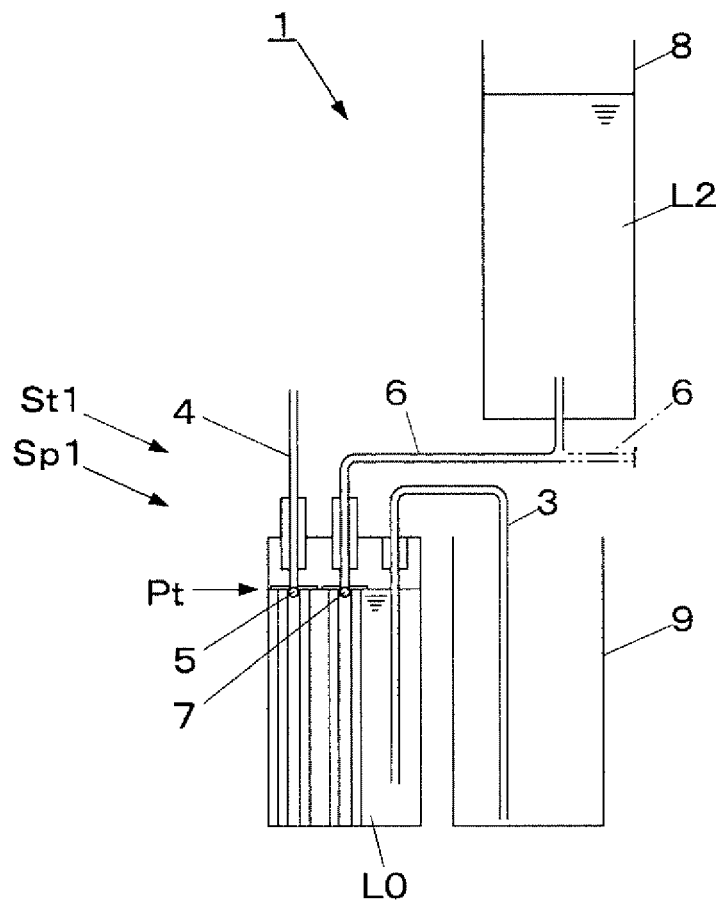
FIG. 10 (consisting of FIGS. 10A to 10C) is a diagram showing how the production apparatus works stepwise.

FIG. 10 illustrates a series of operations using the production apparatus 1 of this embodiment. FIG. 10A shows a sparkling fruit liquor raw material production state St1 when the fermentation container 2 is filled with the stock liquid L0 until the stock liquid L0 reaches the upper limit position Pt.

Figure 10B:
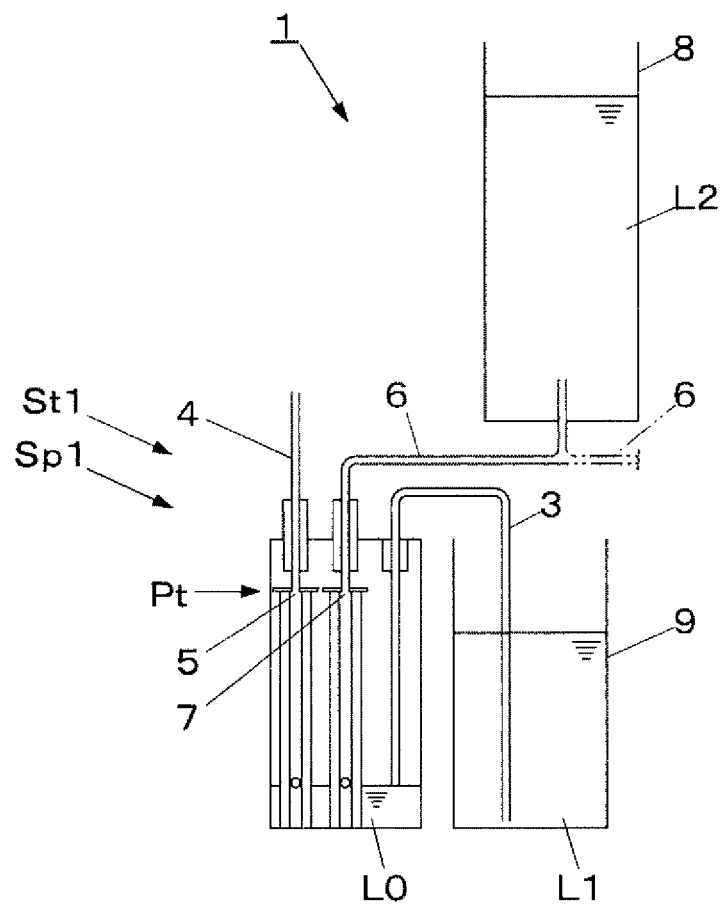
Figure 10C:
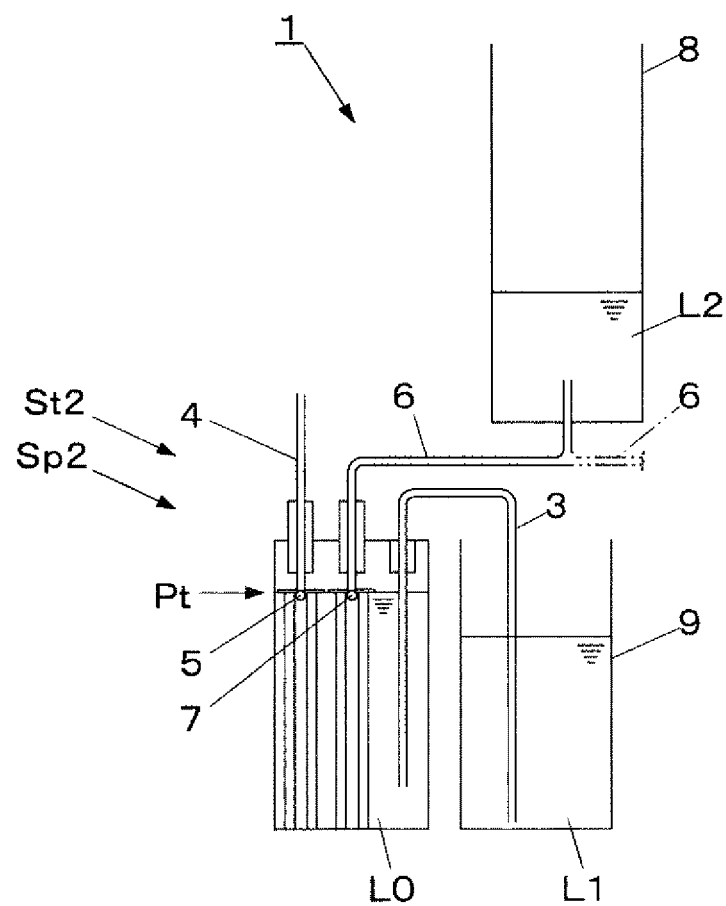

FIG. 10B shows a sparkling fruit liquor raw material production state St1 (immediately before the sugar liquid supply state St2) when the stock liquid L0 in the fermentation container 2 is extracted through the extraction pipe 3 and the level is down to the extraction inlet 3a. FIG. 10C shows a sugar liquid supply state St2 (immediately before the sparkling fruit liquor raw material production state St1) when the fermentation container 2 is filled through the supply pipe 6 with the sugar liquid L2 until the stock liquid L0 reaches the upper limit position Pt.

Figure 8:
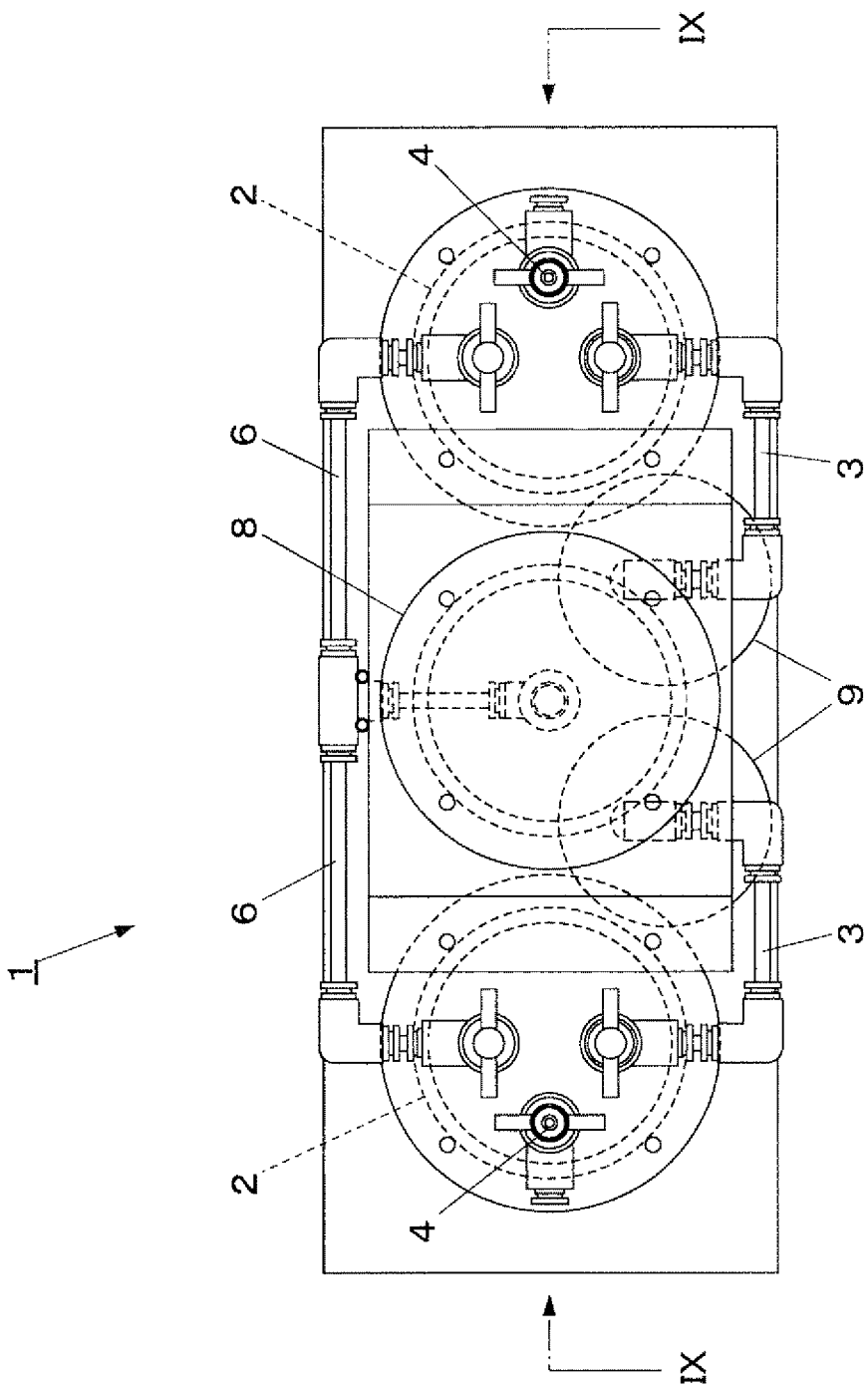
FIG. 8 is a plan view illustrating an embodiment of the production apparatus.
Figure 9:
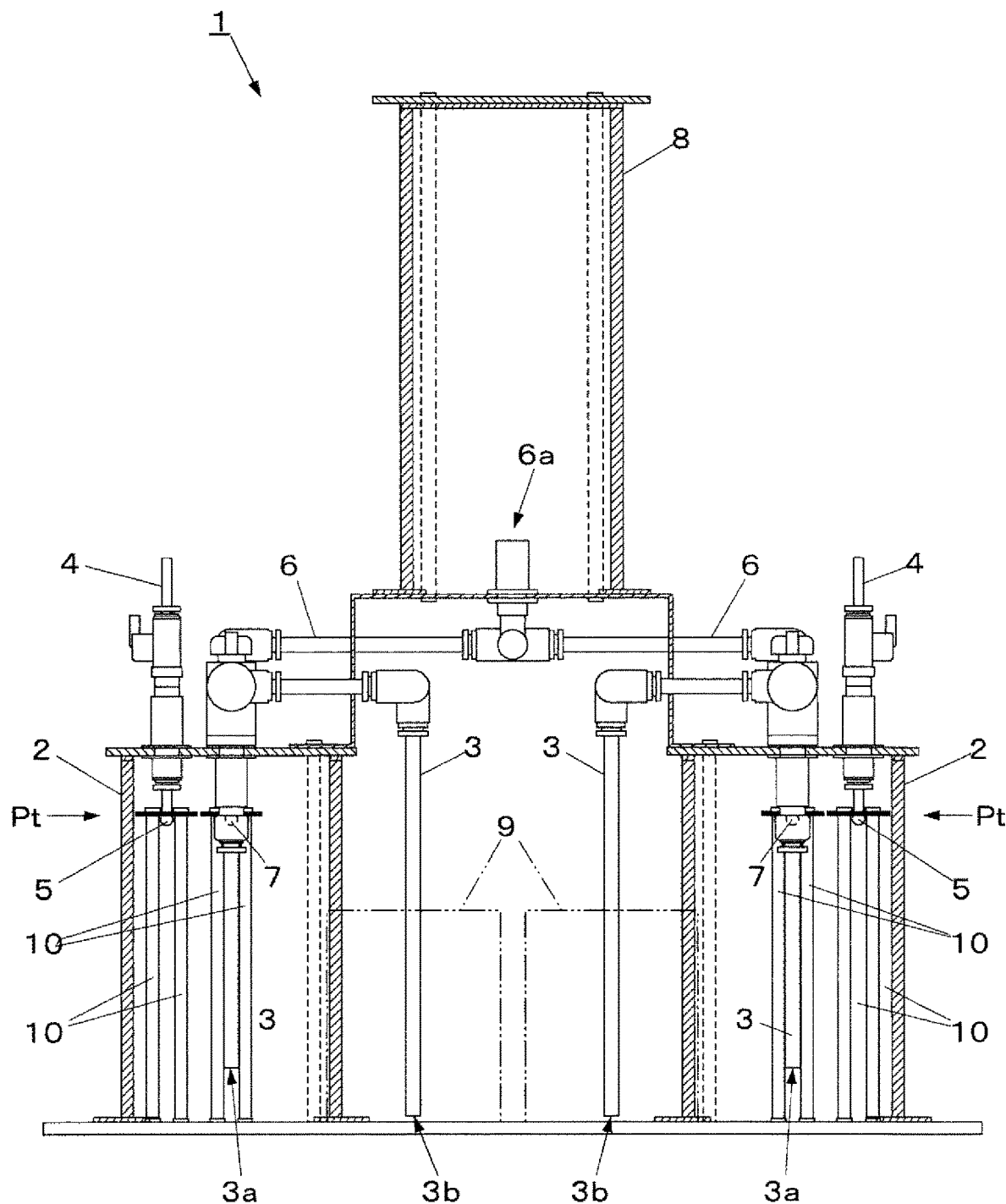
FIG. 9 is a front view illustrating an embodiment of the production apparatus (In the figure, Fermentation Container, Supply Container, and their connecting members are cross-section view through line IX-IX of FIG. 8)

The production apparatus 1 shown in FIGS. 8 and 9 is designed by using the numerical values for the container internal pressure as obtained in the first embodiment, and is structured by connecting the supply container 8 to the two fermentation containers 2. The sparkling fruit liquor raw material L1 was produced using this production apparatus 1. As a result, there was no problem even when supply of the sugar liquid was blocked for several days and/or fruit having natural yeast on the skin was not replaced during the continuous fermentation in the fermentation containers 2. In addition, the fermentation temperature needs a temperature control depending on the product in terms of quality in wine production. However, in the production of the sparkling fruit liquor raw material L1, it was possible to produce the sparkling fruit liquor raw material L1 within the range from 20 to 30° C. without any problem.

The apparatus 1 for producing a sparkling fruit liquor raw material L1 according to this embodiment is configured as described above, and can exert the following effects in addition to the effects similar to those of the first embodiment.

Specifically, in the apparatus 1 for producing a sparkling fruit liquor raw material L1 according to this embodiment, the supply container 8 for supplying a sugar liquid is connected via the supply pipe 6 to each fermentation container 2 for fermenting the stock liquid L0. Also, the fermentation container 2 is provided with the extraction pipe 3, the ventilation port part 4, the ventilation control float 5, and the supply control float 7. According to this configuration, the sparkling fruit liquor raw material L1 can be produced by alternately repeating two states: the sparkling fruit liquor raw material production state St1 configured such that a pressure of carbon dioxide gas generated as fermentation of the stock liquid L0 proceeds is used to continuously extract, from the fermentation container 2 via the extraction pipe 3, the sparkling fruit liquor raw material L1 produced as the stock liquid L0 is fermented; and the sugar liquid supply state St2 configured such that the sugar liquid L2 is supplied into the fermentation container 2 in which the amount of the stock liquid L0 has been decreased under the sparkling fruit liquor raw material production state St1.

Furthermore, substantially the same effects as those of the production apparatus 1 can be exerted by the production method carried out using the apparatus 1 for producing a sparkling fruit liquor raw material L1 according to this embodiment.

It should be noted that the invention is not limited to the above embodiments. For example, the entire production apparatus 1 of this embodiment may be housed in a case and unitized, or may be modified, if appropriate, and embodied without departing from the spirit of the invention.

REFERENCE SIGNS LIST

1 Apparatus for producing a sparkling fruit liquor raw material
2 Fermentation container
3 Extraction pipe
3a Extraction inlet
3b Extraction outlet
3c Valve
4 Ventilation port part
5 Ventilation control float
6 Supply pipe
6a Supply inlet
6b Supply outlet
7 Supply control float
8 Supply container
9 Storage container
10 Float guide
L0 Stock liquid
L1 Sparkling fruit liquor raw material
L2 Sugar liquid
Pt Upper limit position
St1 Sparkling fruit liquor raw material production state
St2 Sugar liquid supply state
Sp1 Sparkling fruit liquor raw material production step
Sp2 Sugar liquid supply step

What is claimed is:

1. An apparatus for producing a sparkling fruit liquor raw material, comprising:
   a fermentation container that is sealed and for receiving a stock liquid in which a fruit juice-containing fruit raw material and yeast are mixed;
   an extraction pipe having an extraction inlet disposed floating at a lower portion of the fermentation container and over a bottom surface in the fermentation container and an extraction outlet disposed outside the fermentation container, a partway of the extraction pipe being arranged so as to pass through a position higher than an upper limit position of the stock liquid in the fermentation container;
   a ventilation port part disposed at an upper end portion of the fermentation container;
   a ventilation control float disposed in the fermentation container and provided such that when a liquid level in the fermentation container reaches the upper limit position, the ventilation port part is closed and when the liquid level in the fermentation container is lower than the upper limit position, the ventilation port part is opened;
   a supply pipe having a supply inlet disposed outside the fermentation container and a supply outlet disposed at an upper end portion of the fermentation container, the supply pipe configured to supply a sugar liquid into the fermentation container; and
   a supply control float disposed in the fermentation container and provided such that when the liquid level in the fermentation container reaches the upper limit position, the supply outlet is closed and when the liquid level in the fermentation container is lower than the upper limit position, the supply outlet is opened;
   wherein
   the sparkling fruit liquor raw material is produced by undergoing a sparkling fruit liquor raw material production state configured such that the stock liquid is charged in the fermentation container so that a top surface of the stock liquid is positioned higher than the extraction inlet and then repeating the sparkling fruit liquor raw material production state and a sugar liquid supply state, wherein, for the sparkling fruit liquor raw material production state, the stock liquid is charged in the fermentation container such that the stock liquid reaches the upper limit position, and a pressure of carbon dioxide gas generated as fermentation of the stock liquid proceeds then causes the ventilation control float and the supply control float to tightly close the ventilation port part and the supply outlet, respectively, while the sparkling fruit liquor raw material production state is maintained so as to continuously extract, from the fermentation container via the extraction pipe, the sparkling fruit liquor raw material produced as the stock liquid fermented; and
   for the sugar liquid supply state, after the stock liquid in the fermentation container is extracted via the extraction pipe to the extraction inlet and the carbon dioxide gas then starts discharging through the extraction pipe, a decrease in the pressure of the fermentation container causes the ventilation control float and the supply control float to open the ventilation port part and the supply outlet, respectively, so that the carbon dioxide gas in the fermentation container is discharged through the ventilation port part and the sugar liquid is supplied via the supply pipe into the fermentation container.

* * * * *